July 13, 1954 L. SCHMID 2,683,377
SYNCHRONIZING DEVICE WITH SLOTTED SYNCHRONIZING MEMBERS
Filed March 6, 1950 2 Sheets-Sheet 1

INVENTOR.
Leopold Schmid
BY
Dicke and Padlon
Attorneys

July 13, 1954     L. SCHMID     2,683,377
SYNCHRONIZING DEVICE WITH SLOTTED SYNCHRONIZING MEMBERS
Filed March 6, 1950     2 Sheets-Sheet 2

INVENTOR.
Leopold Schmid
BY Dicke and Padlon
Attorneys

Patented July 13, 1954

2,683,377

UNITED STATES PATENT OFFICE 2,683,377

SYNCHRONIZING DEVICE WITH SLOTTED SYNCHRONIZING MEMBERS

Leopold Schmid, Gmund in Karnten, Austria, assignor to Porsche Konstruktionen G. m. b. H.

Application March 6, 1950, Serial No. 147,821

Claims priority, application Austria March 5, 1949

1 Claim. (Cl. 74—371)

This invention relates to a synchronizing device with slotted synchronizing members for change-speed gears, and more particularly for power-driven vehicles, as described and claimed in copending application Serial Number 24,564, filed May 1, 1948, and in U. S. Patent No. 2,578,747, dated December 18, 1951.

According to the said copending application, Serial Number 24,564, the crown surfaces of the teeth of the movable members in the gear transmission mechanism are bevelled towards their lateral ends forming frictional surfaces which coact with frictional surfaces of synchronizing members of the counter member. Such frictional surfaces have corresponding inclinations for the purpose of obtaining synchronism in the gear device for the change of speed of the vehicle. It has also been proposed to have these frictional surfaces merge into more steeply inclined centering surfaces for positive shifting of the speed gears.

Now, it has been found, that centering by means of the more steeply inclined surfaces of the teeth of the movable members cannot be obtained to the extent required for insuring the full effect of the form given to the frictional surfaces. Furthermore, in ordinary types not containing the synchronizing device hereinafter disclosed, there may be imparted to the gears harmful strains during shifting, with consequent stuffing or damaging of the change speed gears. Since considerable forces occur during gear changes causing heavy stressing of the parts, more particularly of the synchronizing members, satisfactory precoupling is, therefore, of the greatest importance, so as to avoid damage to the parts of the device.

According to the present invention, one or more synchronizing members disposed on the sliding sleeve of the device are centered by rings screwed onto the body of the sliding sleeve, whereby, on a gear shift being effected, a smooth sliding of the teeth of the change wheels on the periphery of the synchronizing members will be insured. On one side of the device, the sliding sleeve with the sliding member is held by a centering ring which merges into the sliding socket, centering being brought about by screwing on the sleeve.

In order to prevent the synchronizing members from turning on the sliding sleeve, the body of the latter is provided with a lug which is parallel to the axis and is interrupted by the teeth of the movable member and by which any turning of the synchronizing members is prevented, so that powerful forces which occur during the synchronizing action are not taken up by inserted fixed blocks, but directly by the sliding sleeve. The synchronizing members are about one and one-half as broad as the teeth of the toothed wheels, so that the bending stresses acting on them will be so slight that the danger of fractures occurring is practically eliminated.

With the above and other features in view, it is an object of the present invention to provide improvements relating to change speed gears wherein one or more synchronizing members are centered by annular members fixed to the sliding body and whereby said synchronizing members smoothly and effectively cooperate to produce a change in speed of the power driven vehicle containing such gears.

Another object of the present invention is to provide an associated synchronizing mechanism for change speed gears, having sliding means containing one or more synchronizing members centered to the sliding means.

Still another object of the present invention is to provide a synchronizing device having a sliding member with associated slotted synchronizing members for change speed gears for power driven vehicles and the like.

Other objects and features of the present invention will become apparent from the accompanying detailed description of a preferred embodiment taken in conjunction with the accompanying drawings, in which.

Figure 1:
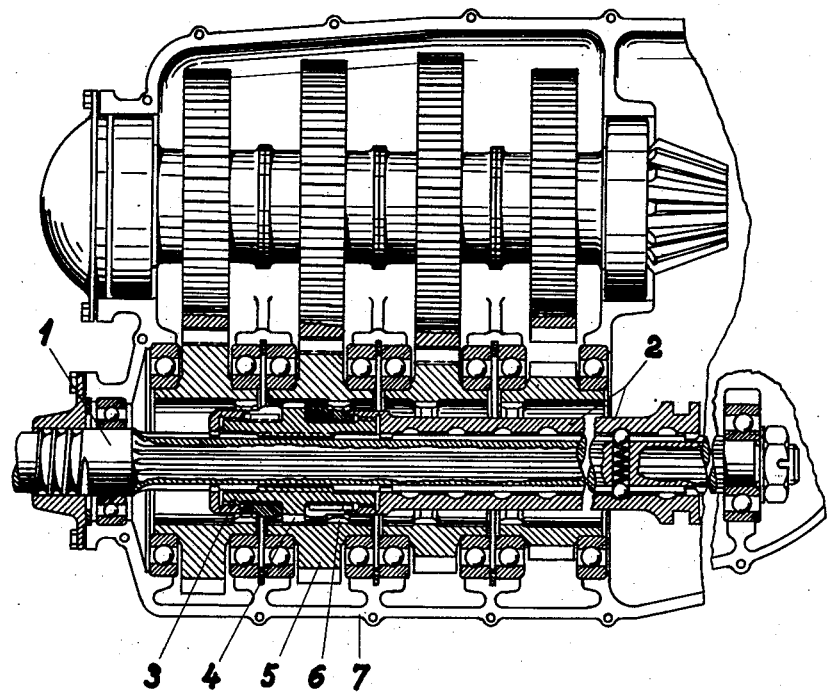
Fig. 1 shows a partly vertical, central longitudinal section through a three-speed change-speed gear with reverse motion of the kind, in which a sliding member is passed through the correspondingly formed change wheels.
Figure 4:
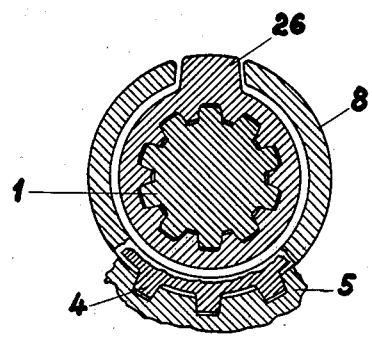
Fig. 4 is a detailed enlarged section of a part of Fig. 3.
Figure 2:
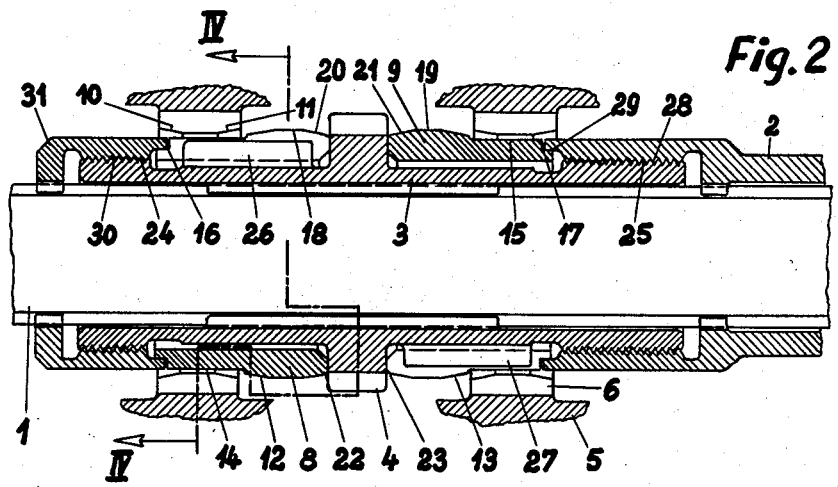
Fig. 2 is a fragmental longitudinal detailed section through the sliding socket with sliding sleeve and the adjacent change wheels of the gear shown in Fig. 1.
Figure 3:
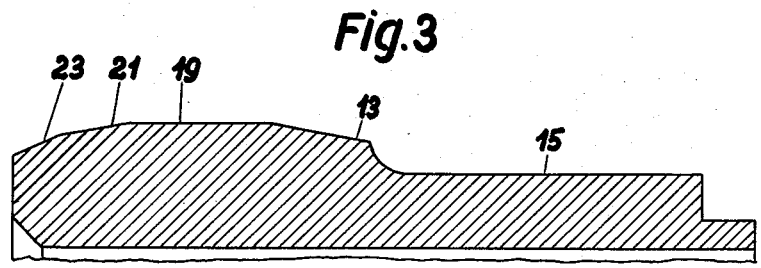
Fig. 3 is a section taken on line III—III of Fig. 2.

The gear mechanism shown by way of example in Fig. 1 has a driving shaft 1, on which a sliding male member or socket 2 is longitudinally slidable thereon and is adapted to turn with the shaft. Connected with the sliding socket 2 and movable therewith is a sliding sleeve 3 provided with a set of gear teeth 4. The change wheels or female coupling wheels 5, through which the sliding sleeve is moved during the gear change operation, have a central bore with internal peripheral teeth 6 and are supported in the casing or housing 7, as shown in Fig. 1. By actuating said socket 2 in the usual well known manner, sleeve 3 is moved to effect gear shifting to the selected change speed wheel 5.

For obtaining synchronization during the gear change operation in the vehicle, there are provided on the sides of the set of teeth 4, slotted spring synchronizing rings 8 and 9, whether synchronization is desired only on stepping down from higher to lower speeds or when stepping up and down such speeds. The synchronizing rings are at least one and one-half as wide as the teeth 6 of the change wheels 5 so as to reduce the bending stresses to which the material of the rings is subjected. The crown surfaces of the teeth 6 are bevelled off towards their lateral ends and form frictional or synchronizing surfaces 10 and 11 of a length corresponding substantially to the inclined portions of the frictional surfaces of the change wheels 5. The synchronizing rings 8 and 9 are also bevelled off at each side in a corresponding manner.

On the outside with respect to the set of teeth 4 of the sleeve 3, the inclination of the bevels is the same as the inclination of the crown surfaces of the internal teeth 6 of the change wheels, whereby inclined frictional surfaces 12 and 13 are formed. Forming a continuation of the inclined surfaces, the synchronizing rings 8 and 9 have cylindrical external surfaces 14 and 15 of smaller diameter and terminate in an offset surface 16 and 17 respectively. The remaining portion of the crown surfaces is substantially parallel to the axis of shaft 1, as is shown at 18 and 19. However, the portions 20 and 21 lying next to the teeth 4 have the same inclination as the bevelled portions 10 and 11 of the internal teeth 6 of the change wheels. Also they have short but more steeply inclined terminal surfaces 22 and 23, which need not necessarily be provided, but which with portions 20 and 21 prevent or reduce the shock of contact during shifting operations. The synchronizing rings are of very great width and may, therefore, be made thin whereby the bending stresses become so small as to avoid any danger of breakage or tear.

The sliding sleeve 3 is provided at both outward ends with an external thread 24 and 25, respectively. Also, there are provided on each side of the set of teeth 4, broad lugs 26 and 27 which are parallel to the axis. Said lugs extend into the slots of the synchronizing rings and prevent the latter from turning with respect to the sleeve. By this means any considerable forces occurring during the synchronizing operation are taken up by the sliding sleeve.

Both the lug and the sliding sleeve do not demand any particular accuracy as regards their dimensions. It will, for instance, suffice if they are forged and subsequently stamped in a die. At its expanded end, the sliding socket 2 has an internal thread 28 and, following immediately on it is an annular grooved surface 29 which, on the sliding sleeve 3 being screwed in, engages over the offset surface 17 and centers the synchronizing ring 8 or 9, so that said synchronizing ring will always be guided without shock onto the internal teeth 6 of the change wheels. Screwed onto the free end of the sliding sleeve 3 is a centering ring 31 provided with an internal thread 30. At its end, the centering ring 31 also has an annular surface which, on the ring being screwed onto the sliding sleeve, will rest on the offset surface 16, thereby centering the synchronizing ring 8 and securing it against longitudinal displacements.

Figure 5:
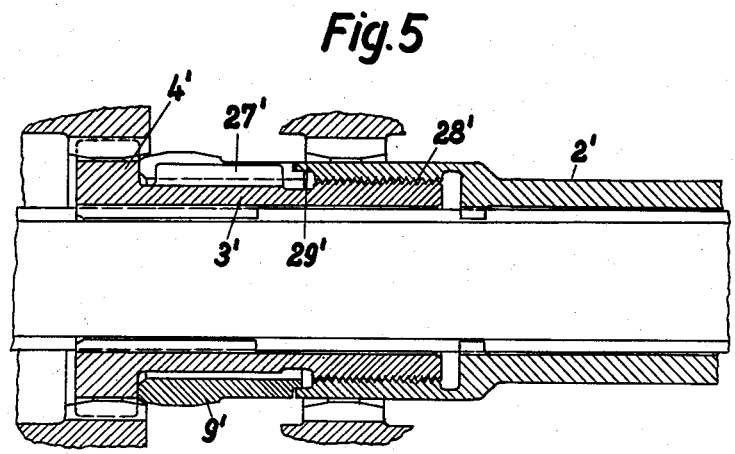
Fig. 5 is a vertical central longitudinal section of a modified constructional form.

In Fig. 5, there is shown a constructional form, in which the synchronizing operation takes place only in one direction, namely, when stepping down from higher to lower speeds. This simplification is possible, as the speed of revolution of the masses to be brought into synchronization decreases sufficiently rapidly during the stepping up operation, so as to take place almost silently. In this arrangement showing a modified form of the invention, the synchronizing ring and the centering ring at the free side of the sliding sleeve 3', which is of shorter construction, become superfluous. The rest of the arrangement is the same as that shown in the preceding figures. The sliding member bears the reference 4', the synchronizing ring 9', the lug 27' and the offset end of the sliding sleeve, provided with the screw thread 28' and forming the centering ring 29', bears the reference 2'.

Furthermore, it will be noted from the foregoing that by my invention there is provided one or more synchronizing members which are centered by rings which are screwed onto a slidable sleeve splined to a drive shaft in gear transmission mechanisms. Also, by my invention there are provided synchronizing members whose width is much greater than the clutch teeth of the gear wheels in the mechanism. Also, said members form a shockproof construction in which they take up the initial stresses during the shifting operation, said stresses being distributed over a wide area of the members. Shifting under such conditions will be smooth and silent.

The invention is not limited to the arrangement illustrated, in which a sliding member is taken through change wheels provided with bores, but is applicable also to other kinds of gears, such as sliding gears.

While preferred embodiments of the invention have herein been described and illustrated, it is to be understood that modifications as to form, arrangement of parts and use of materials may be made without departing from the spirit and scope of the invention as claimed.

I claim:

In a constant mesh power transmission, the combination with a drive shaft and associated spaced change wheel gears for engagement with gear transmission means, and internally arranged gear teeth for selective engagement to operate said change wheel gears for different speeds thereof, of an axially slidable member on the shaft, said member having an enlarged internally threaded terminal portion with an offset thread and means for centering the same on said member, a sliding sleeve connected to said slidable member having an externally threaded portion engaging the terminal portion of said slidable member, said sleeve having another terminal threaded portion, said sleeve having radially extending teeth for selective engagement with said internal gear teeth, a pair of radially extending lugs integral with the sleeve disposed on each side of the gear teeth, a split resilient synchronizing ring abutting each lug on the side thereof, for preengagement with the selected internal gear and an internally threaded centering ring connected with the other end of said sleeve connected to the other terminal threaded portion of the sleeve and adjustably fixed to said drive shaft, said sliding sleeve being adjustable between the centering ring and the slidable member whereby the intermediate split rings are adjustably centered intermediate the gear teeth on one side and the respective centering ring and the enlarged internally threaded terminal portion on the other side.

References Cited in the file of this patent

UNITED STATES PATENTS

| Number | Name | Date |
|---|---|---|
| 1,967,190 | Cousino | July 17, 1934 |
| 2,001,141 | Kittelsen | May 14, 1935 |
| 2,044,930 | Zubaty | June 23, 1936 |
| 2,416,154 | Chilton | Feb. 18, 1947 |
| 2,578,747 | Schmid | Dec. 18, 1951 |
| 2,579,090 | Rabe | Dec. 18, 1951 |